(12) United States Patent
Wang et al.

(10) Patent No.: US 11,384,852 B2
(45) Date of Patent: Jul. 12, 2022

(54) BALL VALVE

(71) Applicant: ZHEJIANG SANHUA AUTOMOTIVE COMPONENTS CO., LTD., Hangzhou (CN)

(72) Inventors: Lixin Wang, Hangzhou (CN); Hong Hu, Hangzhou (CN); Zhengwei Wang, Hangzhou (CN); Jufeng Ma, Hangzhou (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 0 days.

(21) Appl. No.: 17/309,299

(22) PCT Filed: Nov. 6, 2019

(86) PCT No.: PCT/CN2019/115843
§ 371 (c)(1),
(2) Date: May 17, 2021

(87) PCT Pub. No.: WO2020/134613
PCT Pub. Date: Jul. 2, 2020

(65) Prior Publication Data
US 2022/0025977 A1    Jan. 27, 2022

(30) Foreign Application Priority Data

Dec. 24, 2018 (CN) .......................... 201811582840.8
Dec. 24, 2018 (CN) .......................... 201811582853.5

(51) Int. Cl.
*F16K 11/087* (2006.01)
*F16K 27/06* (2006.01)
(Continued)

(52) U.S. Cl.
CPC ........ *F16K 11/0873* (2013.01); *F16K 27/067* (2013.01); *F16K 31/043* (2013.01); *F16K 31/535* (2013.01)

(58) Field of Classification Search
CPC .. F16K 11/0873; F16K 11/087; F16K 27/067; F16K 31/043; F16K 31/041; F16K 31/535; F16K 31/53; F16K 5/0647
See application file for complete search history.

(56) References Cited

U.S. PATENT DOCUMENTS 3,776,507 A * 12/1973 Tomlin .................... F16K 31/54
251/248
6,378,841 B1 * 4/2002 Russell ................. F16K 31/535
251/192

(Continued)

FOREIGN PATENT DOCUMENTS

CN     102052484 A    5/2011
CN     206958295 U    2/2018
(Continued)

OTHER PUBLICATIONS

International Search Report issued from the International Seach Authority to PCT Application No. PCT/CN2019/115843 dated Jan. 31, 2020, 4 pages.

(Continued)

*Primary Examiner* — David Colon-Morales
(74) *Attorney, Agent, or Firm* — Hunton Andrews Kurth LLP (57) ABSTRACT

Disclosed is a ball valve, including a drive mechanism, a transmission mechanism, a valve body assembly and a valve core component. The transmission mechanism is configured to drive the valve core component to act through the drive mechanism. The valve body assembly includes a first valve body component and a second valve body component. The first valve body component is fixedly connected to the
(Continued)

second valve body component. The valve body assembly is formed with a containing cavity. The transmission mechanism includes a first gear ring, and at least part of the valve core component is fixedly connected to or in position-limiting fit with the first gear ring. The valve core component includes a platform part and a plane part. The platform part is located at or adjacent to a rotating center of the valve core component.

17 Claims, 7 Drawing Sheets

(51) Int. Cl.
*F16K 31/04* (2006.01)
*F16K 31/53* (2006.01)

(56) References Cited

U.S. PATENT DOCUMENTS

| | | | |
|---|---|---|---|
| 8,496,228 B2 * | 7/2013 | Burgess | F16K 5/0621 251/315.1 |
| 9,404,594 B2 * | 8/2016 | Morein | F16K 11/0856 |
| 9,855,451 B1 * | 1/2018 | Kim | A62C 33/06 |
| 9,903,483 B2 * | 2/2018 | Liu | F16K 5/204 |
| 10,808,863 B2 * | 10/2020 | Bugeja | F16K 11/165 |
| 10,920,893 B2 * | 2/2021 | Chen | F16K 5/201 |
| 11,073,216 B2 * | 7/2021 | Kondo | F16K 5/0626 |
| 2013/0140475 A1 * | 6/2013 | Burgess | F16K 31/043 251/65 |
| 2015/0354714 A1 | 12/2015 | Morein | |
| 2021/0047959 A1 * | 2/2021 | Jafari | F16K 31/535 |
| 2021/0164576 A1 * | 6/2021 | Cheng | F16K 31/535 |
| 2021/0190232 A1 * | 6/2021 | Andrews | F16K 5/0605 |

FOREIGN PATENT DOCUMENTS

| | | |
|---|---|---|
| CN | 207049360 U | 2/2018 |
| CN | 107763240 A | 3/2018 |
| CN | 108730553 A | 11/2018 |
| CN | 108730558 A | 11/2018 |
| CN | 208919396 U | 5/2019 |
| CN | 209385764 U | 9/2019 |
| JP | S5947574 A | 3/1984 |
| JP | 2018123935 A | 8/2018 |

OTHER PUBLICATIONS

First Chinese Office Action, The State Intellectual Property Office of People's Republic of China, issued to CN Application No. 201811582853.5 dated Nov. 25, 2021, 16 pages.

* cited by examiner

BALL VALVE

CROSS-REFERENCE TO RELATED APPLICATIONS

This application is a U.S. National Stage Application filed under 35 U.S.C. § 371 based on International Application Serial No. PCT/CN2019/115843 filed Nov. 6, 2019, which claims priorities to Chinese Patent Application No. 201811582840.8 filed Dec. 24, 2018, and Chinese Patent Application No. 201811582853.5 filed Dec. 24, 2018, the disclosures of which are incorporated herein by reference in their entireties.

TECHNICAL FIELD

The present application relates to the technical field of fluid control, for example, a ball valve.

BACKGROUND

An electric ball valve may be used as a component of a thermal management system such as a new energy vehicle air conditioning system and battery cooling, and has a function of switching a flow direction of a medium. Generally, a transmission mechanism of a common electric ball valve is in transmission connection with a valve core of the common electric ball valve through a valve rod. A first end of the valve rod is located outside a valve body, and a second end of the valve rod extends into the valve body. The transmission mechanism and the valve core are separated by the valve body at an interval. Moreover, it is also necessary to provide a valve cover to limit the up-and-down displacement of a valve core ball, and thus the structure of the electric ball valve is more complex.

SUMMARY

The present application provides a ball valve which can solve a technical problem that a ball valve is more complex in structure due to the fact that a transmission mechanism and a valve core are separated by a valve body at an interval, and it is also necessary to provide a valve cover to limit the up-and-down displacement of a valve core ball.

An embodiment provides a ball valve. The ball valve includes a drive mechanism, a transmission mechanism, a valve body assembly and a valve core component. The transmission mechanism is configured to drive the valve core component to act through the drive mechanism. The valve body assembly includes a first valve body component and a second valve body component, and the first valve body component is fixedly connected to the second valve body component. The valve body assembly is formed with a containing cavity, and the containing cavity includes a first valve body component cavity and a second valve body component cavity. The first valve body component cavity is located within the first valve body component, and the second valve body component cavity is located within the second valve body component. The valve core component is at least partially accommodated in the first valve body component cavity, and the transmission mechanism is at least partially located in the second valve body component cavity. The transmission mechanism includes a first gear ring, and at least part of the valve core component is fixedly connected to or in position-limiting fit with the first gear ring. The valve core component includes a platform part and a plane part, and the platform part is located at or adjacent to a rotating center of the valve core component. One side of the first gear ring facing toward the valve core component abuts against the platform part, and the one side of the first gear ring facing toward the valve core component keeps a preset distance from the plane part.

DETAILED DESCRIPTION

As shown in FIGS. 1 to 14, a ball valve of the present embodiment includes a drive mechanism 10, a valve body assembly 11, a transmission mechanism 12 and a valve core component 13. As shown in FIG. 2, the drive mechanism 10 includes a stator coil 1, a motor shaft component 2, a rotor component 3 and a sleeve 8. The motor shaft component 2 is fixedly connected to the rotor component 3, the rotor component 3 rotates to drive the motor shaft component 2 to rotate. The sleeve 8 is a tubular body with one end closed. The stator coil 1 is sleeved outside the sleeve 8.

At least part of the rotor component 3 is built into the sleeve 8.

Figure 3:
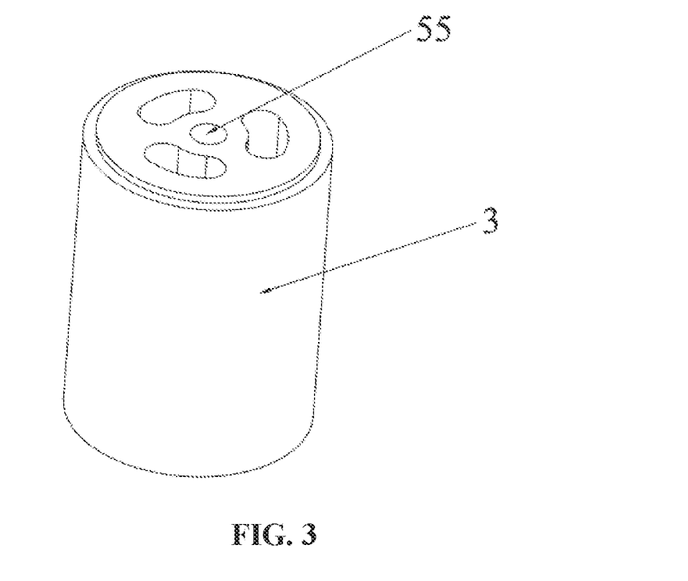
FIG. 3 is a schematic perspective view of a rotor component in the ball valve shown in FIG. 1.

As shown in FIG. 3, the rotor component 3 is provided with a first via hole 55 located at or adjacent to an axial central line of the rotor component 3, the motor shaft component 2 passes through the first via hole 55, the motor shaft component 2 is fixedly connected to the rotor component 3 through injection molding, and the motor shaft component 2 may also be disposed in a key-and-slot fit with the rotor component 3, and therefore, the firmness of the bonding of the motor shaft component 2 with the rotor component 3 is enhanced.

Figure 4:
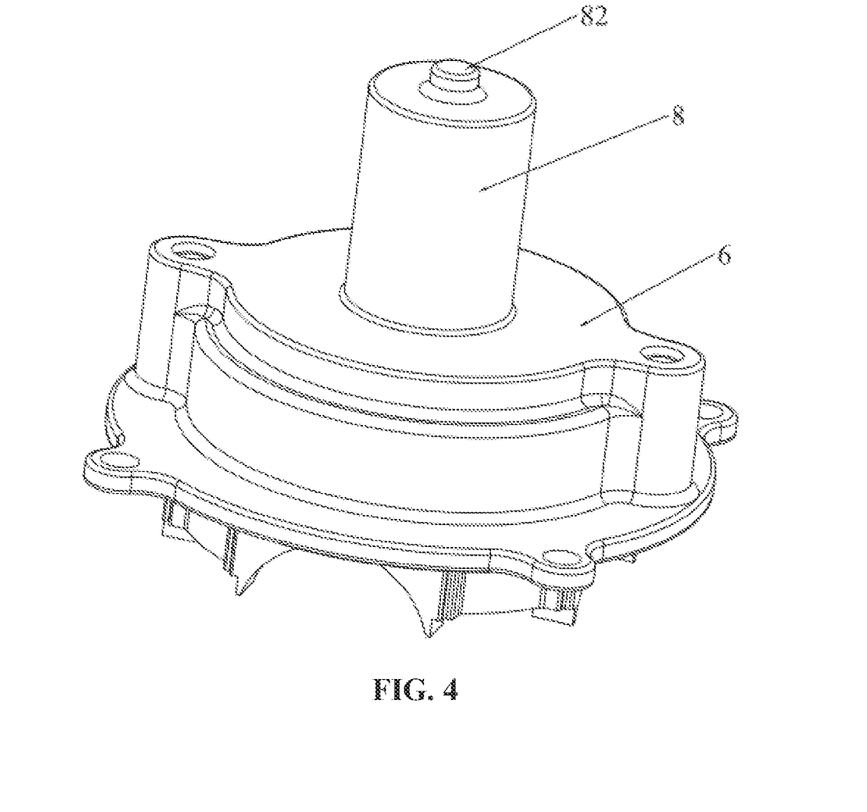
FIG. 4 is a schematic perspective view of a sleeve and a second valve body component in the ball valve shown in FIG. 1.

The closed end of the sleeve 8 is defined as a top part, as shown in FIG. 4, a first blind hole part 82 protruding outwardly is formed at or adjacent to a center of the top part of the sleeve 8, one end of the motor shaft component 2 facing toward the rotor component 3 extends into the first blind hole part 82, the motor shaft component 2 is in clearance fit with the first blind hole part 82, and the first blind hole part 82 is used to limit the motor shaft component 2.

Figure 1:
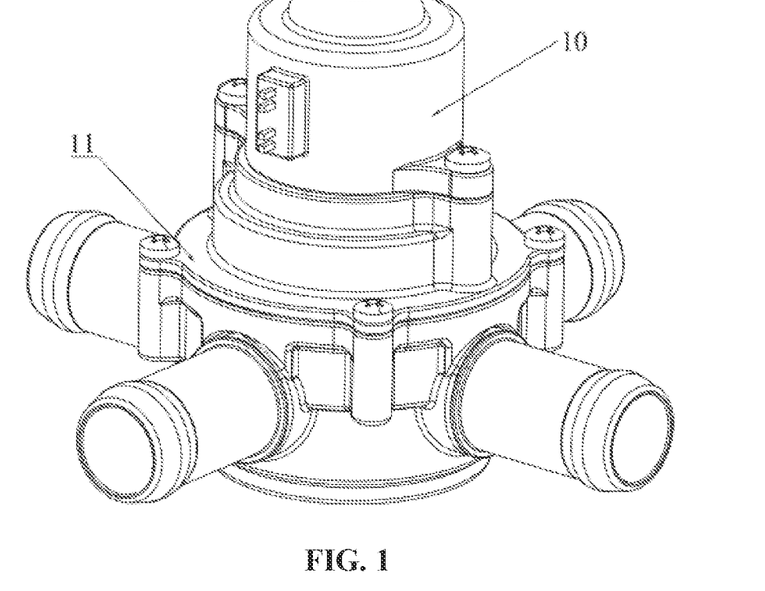
FIG. 1 is a schematic perspective view of a ball valve provided by an embodiment of the present disclosure.
Figure 2:
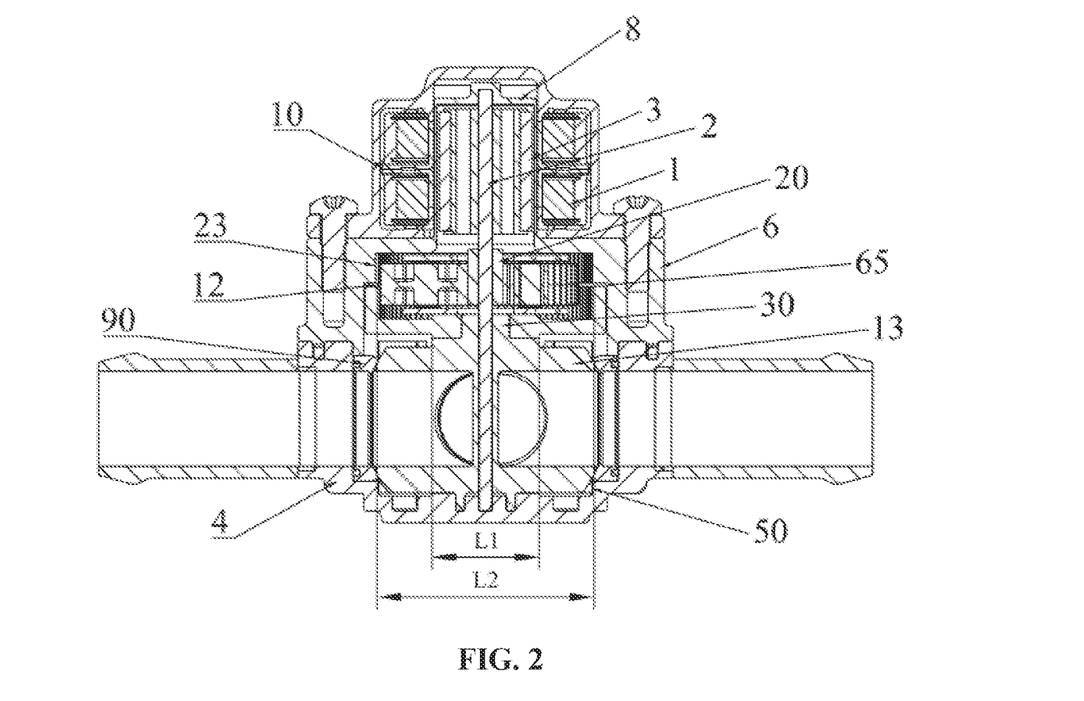
FIG. 2 is a cross-sectional view of the ball valve shown in FIG. 1.

As shown in FIGS. 1 and 2, the valve body assembly 11 includes a first valve body component 4 and a second valve body component 6. The sleeve 8 and the second valve body component 6 may be integrally formed by an injection molding process when the valve body assembly 11 is made of a plastic material, as shown in FIG. 4, with such arrangement, the sealing performance between the sleeve 8 and the second valve body component 6 is better. In an embodiment, the sleeve 8 and the second valve body component 6 may also be fixedly connected by providing a connection seat.

Figure 5:
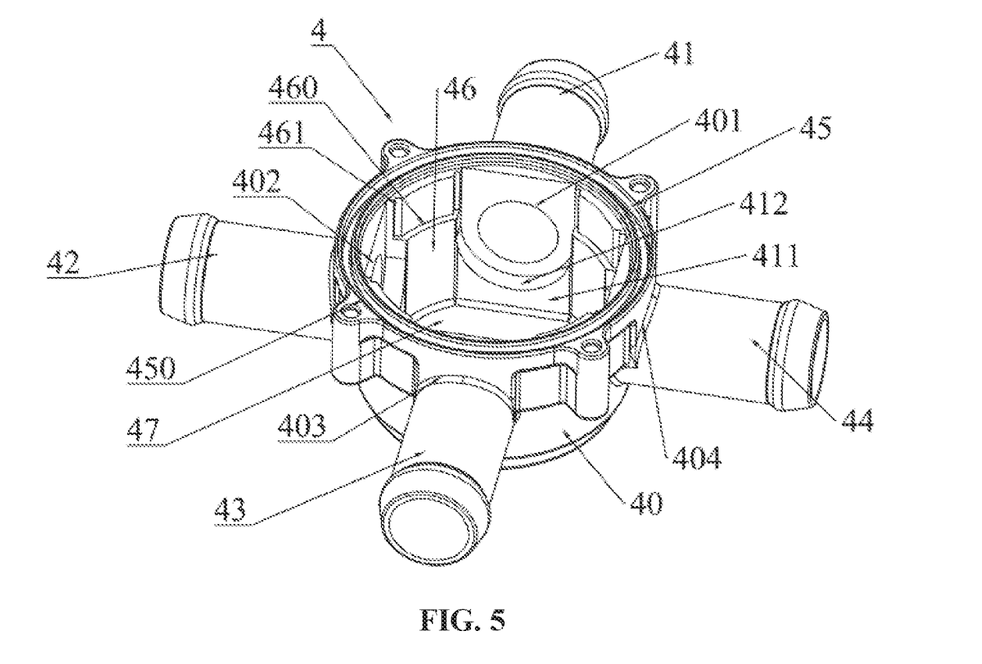
FIG. 5 is a schematic perspective view of a first valve body component in the ball valve shown in FIG. 1.

As shown in FIG. 5, the first valve body component 4 includes a valve body part 40. One end of the valve body part 40 is disposed to be open, the valve body part 40 includes a port part 45, the port part 45 is located at the open end of the valve body part 40, the open end of the valve body part 40 is defined as the top part, and another end of the valve body part 40 opposite to the top part is defined as a bottom part. One end of the second valve body component 6 cooperates with the port part 45, and the second valve body component 6 is fixed to the valve body part 40 by a bolt connection. In an embodiment, the second valve body component 6 and the valve body part 40 may be fixedly connected by other forms such as welding.

An end face part of the port part 45 of the valve body part 40 is further provided with an annular groove 450, a sealing gasket is arranged inside the annular groove 450, and therefore the sealing performance of the connecting between the second valve body component 6 and the valve body part 40 is improved. In an embodiment, the second valve body component 6 is fixed to the valve body part 40 by welding, and then the sealing gasket may not need to be provided.

As shown in FIG. 2, the valve body assembly 11 is formed with a containing cavity. The containing cavity includes a first valve body component cavity 50 located within the valve body part 40, at least part of the valve core component 13 is accommodated within the first valve body component cavity 50. The containing cavity further includes a second valve body component cavity 65. The second valve body component cavity 65 is located within the second valve body component 6, and at least part of the transmission mechanism 12 is located within the second valve body component cavity 65.

Figure 6:
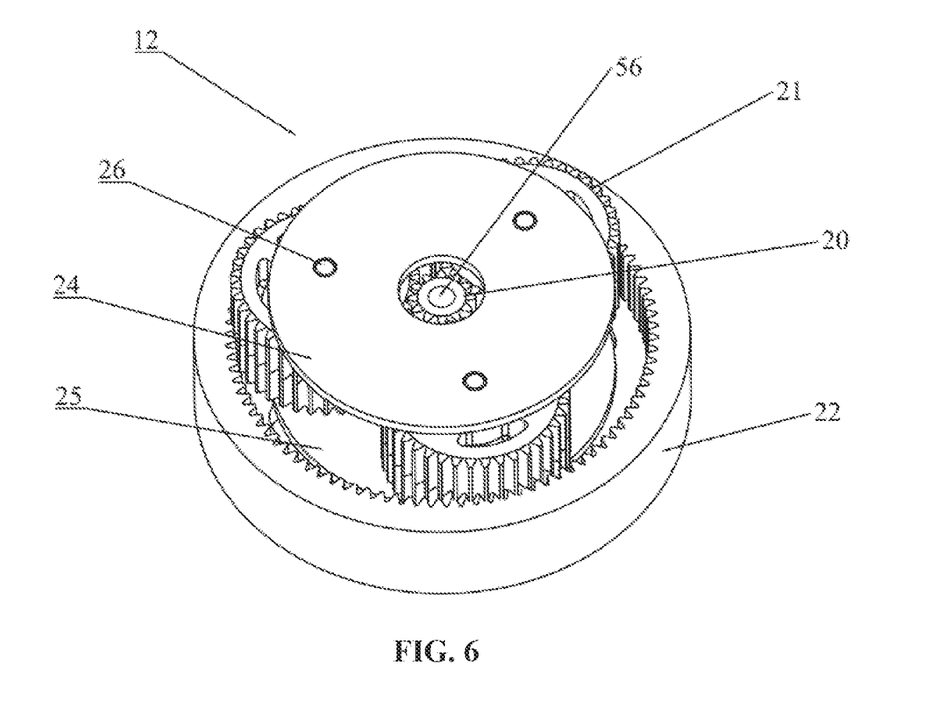
FIG. 6 is a schematic perspective view of a transmission mechanism in the ball valve shown in FIG. 1.

As shown in FIGS. 2 and 6, the transmission mechanism 12 includes a sun gear 20, a planet gear 21, a first gear ring 22, a second ring gear 23, a first mounting plate 24, a second mounting plate 25, and a gear shaft 26. In this embodiment, three planet gears 21 are provided, and three gear shafts 26 are provided accordingly. The first mounting plate 24 and the second mounting plate 25 each may have a circular ring structure. A central circular through hole of the first mounting plate 24 and a central circular through hole of the second mounting plate 25 facilitate the cooperation of the motor shaft component 2 and the sun gear 20. The three planet gears 21 are rotatably disposed between the first mounting plate 24 and the second mounting plate 25 through the gear shafts 26, and the three planet gears 21 are all meshingly connected to the sun gear 20.

Both the first gear ring 22 and the second ring gear 23 have an inner tooth part. A first end of the planet gear 21 is meshingly connected to the first gear ring 22 at the inner tooth part of the first gear ring 22. A second end of the planet gear 21 is meshingly connected to the second ring gear 23 at the inner tooth part of the second ring gear 23. The second ring gear 23 is fixedly connected to the second valve body component 6 on one side facing away from the planet gear 21, for example, the second ring gear 23 is mounted to the second valve body component 6 in an interference fit or position-limiting fit manner.

In an embodiment, the second valve body component 6 and the second ring gear 23 are both made of a plastic material, and then the second ring gear 23 may be integrally formed with the second valve body component 6, such as, by the injection molding process; with such arrangement, the number of parts of the ball valve are reduced and the assembly of the ball valve is more convenient.

The motor shaft component 2 is in transmission connection with the transmission mechanism 12. The sun gear 20 is provided with a second via hole 56 (refer to FIG. 6) located at or adjacent to the axial central line of the sun gear 20, and the motor shaft component 2 passes through the second via hole 56. The motor shaft component 2 and the sun gear 20 may be in an interference pressing connection or snapping connection. When the motor shaft component 2 rotates, the sun gear 20 rotates synchronously so as to drive the planet gear 21, the first gear ring 22, and the second ring gear 23 to rotate. When the transmission ratios are the same, this transmission mechanism has a relatively compact structure and a small volume, so that the volume of the ball valve is relatively reduced.

Figure 7:
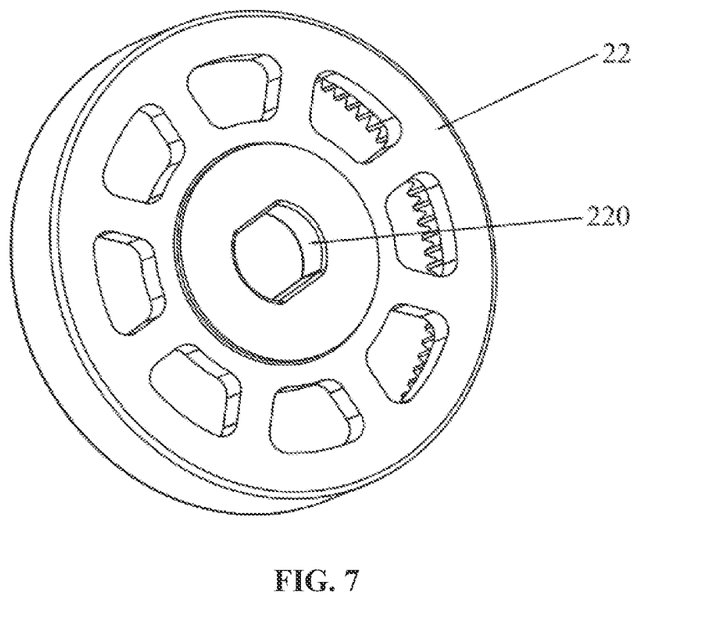
FIG. 7 is a schematic perspective view of a first gear ring in the ball valve shown in FIG. 1.
Figure 8:
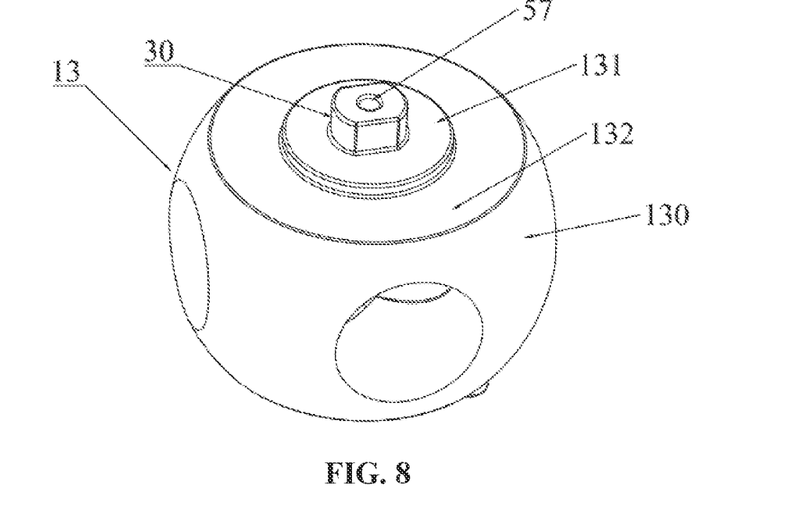
FIG. 8 is a schematic perspective view of a valve core component in the ball valve shown in FIG. 1.

As shown in FIG. 7, the first gear ring 22 has a central hole 220. As shown in FIG. 8, the valve core component 13 includes a valve core ball 130 and a valve core column 30. A first end of the valve core column 30 extends into the central hole 220 and is in interference pressing connection with the central hole 220; or the central hole 220 may be disposed in a special shape, and correspondingly, the shape of the valve core column 30 fits with that of the central hole to achieve rotation driving, that is, the valve core column 30 cooperates with the first gear ring 22 to enable the first gear ring 22 to drive valve core column 30 to rotate. A second end of the valve core column 30 is in transmission connection with the valve core ball 130, or the valve core column 30 and the valve core ball 130 are an integrated structure. The valve core column 30 can drive the valve core ball 130 to rotate together when the valve core column 30 rotates.

In an embodiment, the valve core ball 130 may also be provided with a clamping slot, and the valve core column 30 cooperates with the clamping slot to achieve the rotation driving. In this embodiment, the valve core column 30 and the valve core ball 130 are an integrated structure.

In an embodiment, the valve core ball 130 may also be disposed in a common shape such as a cylindrical shape or an oval shape.

As shown in FIGS. 8 and 2, the valve core ball 130 includes a platform part 131, and the platform part 131 is located at or adjacent to a rotation center of the valve core component 13. The valve core column 30 is fixedly connected to the platform part 131, or the valve core column 30 and the platform part 131 are an integral structure; or the valve core column 30 includes a platform part 131, and the platform part 131 is fixedly connected to the valve core ball 130, or the platform part 131 and the valve core ball 130 are an integral structure. One side of the first gear ring 22 facing toward the valve core component 13 abuts against the platform part 131, and the outer diameter L1 of the platform part 131 is less than the inner diameter L2 of the first gear ring 22, so that the driving force required for driving the valve core component 13 is reduced.

As shown in FIGS. 2 and 8, one side of the valve core ball 130 facing toward the first gear ring 22 is further provided with a plane part 132. The plane part 132 is disposed around the platform part 131, and the platform part 131 protrudes out of the plane part 132 in a direction facing toward the first gear ring 22. As shown in FIG. 2, a preset distance is kept between one side of the first gear ring 22 facing toward the valve core component 13 and the plane part 132. In an embodiment, the plane part 132 may also be configured as a curved surface part or a tapered surface part, or the like.

In this embodiment, the transmission mechanism 12 is in direct contact with the valve core component 13, that is, the one side of the first gear ring 22 facing toward the valve core component 13 abuts against the platform part 131; with such arrangement, a valve cover of the first valve body component 4 is omitted, the parts of the ball valve are reduced, and thus the structure of the ball valve is more compact.

In an embodiment, the central hole 220 of the first gear ring 22 may be configured as a stepped hole part, and the stepped hole part includes a stepped part. The valve core column 30 includes a platform part, and the platform part is located at one end of the valve core column 30 facing toward the first gear ring 22. The valve core column 30 extends into the stepped hole part, and the platform part of the valve core column 30 abuts against the stepped part. The one side of the valve core ball 130 facing toward the first gear ring 22 is further provided with the plane part, and the preset distance is kept between the one side of the first gear ring 22 facing toward the valve core component 13 and the plane part of the valve core ball 130. With such arrangement, a contact face of the first gear ring 22 with the valve core component 13 has a less diameter, and thus the driving force required for driving the valve core component 13 is better reduced. In an embodiment, the first gear ring 22 having the stepped hole part may abut against both types of platform parts described above at the same time.

As shown in FIG. 8, the valve core component 13 is provided with a through hole 57 located at or adjacent to the axial central line of the valve core component 13. Part of the through hole 57 is located in the valve core column 30, and part of the through hole 57 is located in the valve core ball 130. The motor shaft component 2 passes through the through hole 57, and the motor shaft component 2 is in clearance fit with an inner wall corresponding to the through hole 57. In an embodiment, the motor shaft component 2 cannot directly drive the valve core component 13 to rotate when the motor shaft component 2 rotates, while the motor shaft component 2 can drive the valve core component 13 to rotate through the first gear ring 22.

Figure 10:
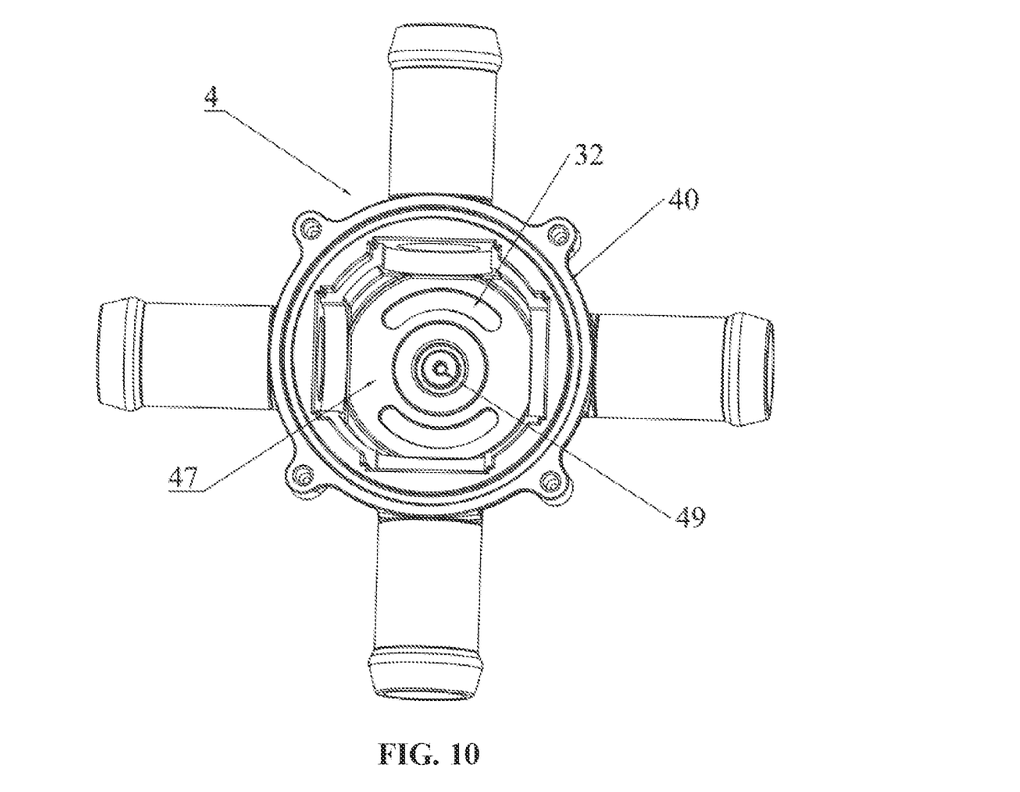
FIG. 10 is schematic perspective view of the first valve body component in the ball valve shown in FIG. 1 viewed from still another perspective.

As shown in FIGS. 2 and 10, the valve body part 40 further includes an inner bottom part 47. The inner bottom part 47 is provided with a second blind hole part 49 located at a position corresponding to the through hole 57. An axis of the second blind hole part 49 coincides with or approximately coincides with an axis of the first blind hole part 82. One end of the motor shaft component 2 facing toward the valve core component 13 extends into the second blind hole part 49, the motor shaft component 2 is in clearance fit with the second blind hole part 49, and the second blind hole part 49 is used to limit the motor shaft component 2.

In this embodiment, the motor shaft component 2 passes through the rotor component 3, the sun gear 20, and the valve core component 13 in sequence. A first end of the motor shaft component 2 is position-limited within the first blind hole part 82, a second end of the motor shaft component 2 is position-limited within the second blind hole part 49, and the motor shaft component 2 is in clearance fit with the valve core part 13. With such arrangement, the valve core component 13 can be prevented from being deflected and shaking in a rotating process, which is beneficial to improve the stability of the valve core component 13.

Figure 9:
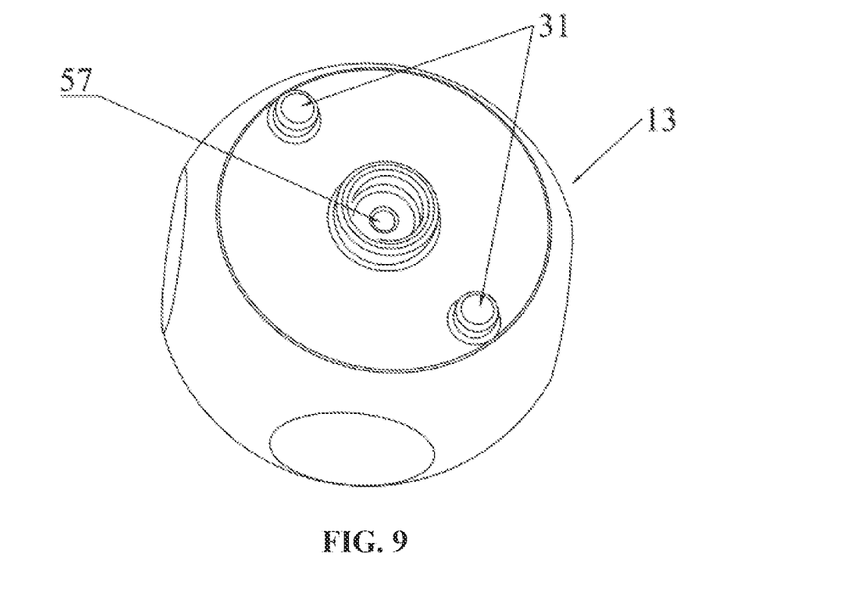
FIG. 9 is a schematic perspective view of the valve core component in the ball valve shown in FIG. 1 viewed from another perspective.

As shown in FIG. 9, one side of the valve core component 13 facing toward the inner bottom part 47 is further provided with at least one limiting column 31. In this embodiment, two limiting columns 31 are provided, and the two limiting columns 31 are symmetrically disposed on both sides of an axis of the valve core component 13, the two limiting columns 31 and the valve core component 13 may be an integrated structure.

As shown in FIG. 10, the inner bottom part 47 of the valve body part 40 is provided with a limiting groove that cooperates with the limiting column 31. The limiting column 31 is in sliding fit with the limiting groove, and the limiting groove includes at least one arc-shaped groove 32. In this embodiment, the limiting groove includes two arc-shaped grooves 32, and the two arc-shaped grooves 32 are symmetrically distributed about the second blind hole part 49 as a center.

At least part of the limiting column 31 extends into the arc-shaped groove 32, and an inner wall of the arc-shaped groove 32 is in sliding fit with the limiting column 31. The limiting column 31 is position-limited by cooperating with the inner wall of the arc-shaped groove 32, two ends of the arc-shaped groove 32 can limit a rotation range of the valve core component 13. When the valve core component 13 rotates clockwise, and an inner wall of one end of the arc-shaped groove 32 abuts against the limiting column 31, the valve core component 13 stop rotating in a clockwise direction. Generally, the rotation range of the valve core component 13 may be limited by setting a magnitude of an arc angle between the two ends of the arc-shaped groove 32. In this embodiment, the arc angle of the arc-shaped groove 32 is set to 90°, and the arc angle may be set adaptively in different working environments.

The working principle of the ball valve provided in this embodiment is as follows. When the motor shaft component 2 rotates clockwise, the sun gear 20 is driven to rotate clockwise, and then the planet gear 21 is driven to rotate through a meshing connection. The second ring gear 23 is fixed, and the planet gear 21, during rotating around an axis of the planet gear 21, rotates circumferentially around the sun gear 1, that is, the planet gear 21 rotates about the motor shaft component 2, and meshingly rotates with the second gear ring 23, so that the first gear ring 22 is driven to rotate. The first gear ring 22 drives the valve core column 30 to rotate together, and meanwhile the valve core column 30 drives the valve core ball 130 to rotate at a rotation angle of 0° to 90°. When an inner wall of one end of the arc-shaped groove 32 abuts against the limiting column 31, the valve core component 13 stop rotating in a rotating direction, the same is true when the motor shaft component 2 rotates counterclockwise.

As shown in FIG. 5, the valve body part 40 is further provided with a first opening part 401, a second opening part 402, a third opening part 403, and a fourth opening part 404. The first opening part 401, the second opening part 402, the third opening part 403, and the fourth opening part 404 are disposed on a peripheral side of the valve body part 40 in a clockwise direction or a counterclockwise direction, and are symmetrically disposed with respect to a center of the valve body part 40.

Figure 11:
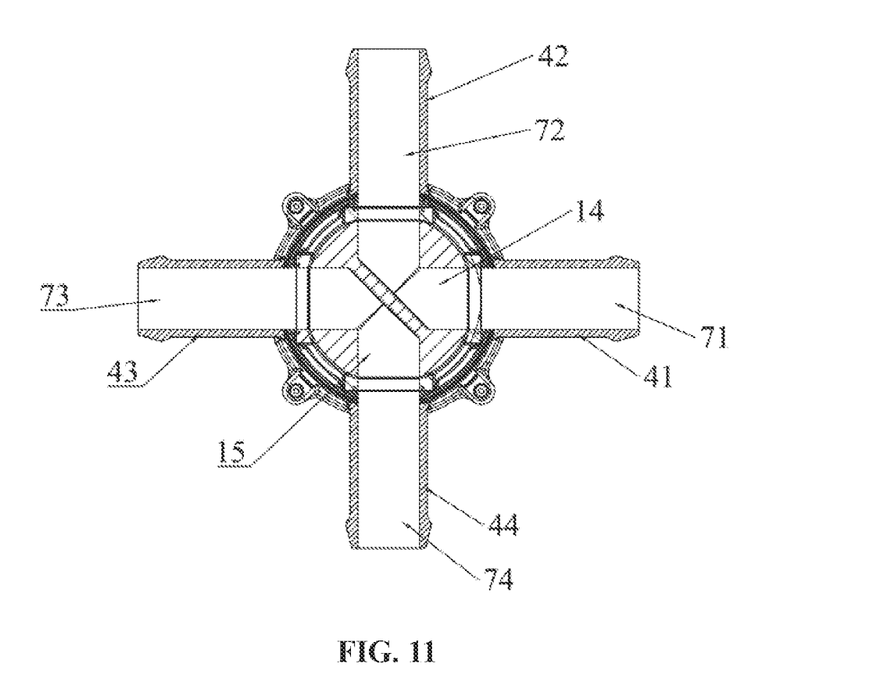
FIG. 11 is a schematic cross-sectional view of a ball valve in a first working state provided by an embodiment of the present disclosure.

The first valve body component 4 further includes a first interface part 41, a second interface part 42, a third interface part 43, and a fourth interface part 44. As shown in FIG. 11, the first interface part 41 is provided with a first channel 71, the second interface part 42 is provided with a second channel 72, the third interface part 43 is provided with a third channel 73, and the fourth interface part 44 is provided with a fourth channel 74. One end of the first interface part 41 is fixedly and sealingly connected to the first opening part 401, one end of the second interface part 42 is fixedly and sealingly connected to the second opening part 402, one end of the third interface part 43 is fixedly and sealingly connected to the third opening part 403, and one end of the fourth interface part 44 and sealingly is fixedly connected to the fourth opening part 404.

Figure 12:
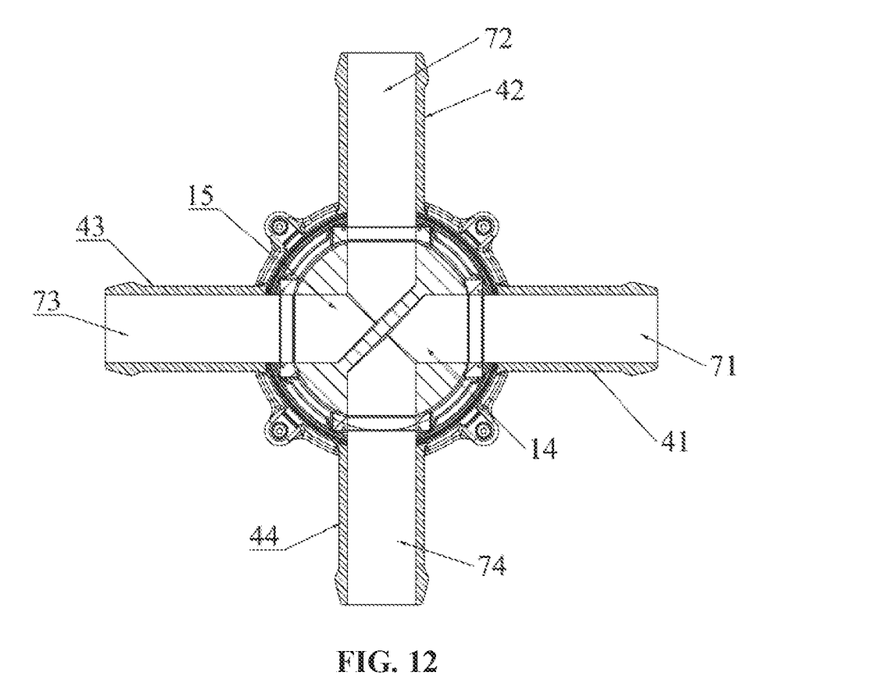
FIG. 12 is a schematic cross-sectional view of a ball valve in a second working state provided by an embodiment of the present disclosure.

As shown in FIG. 11, a first valve core channel 14 and a second valve core channel 15 are provided inside the valve core ball 130. The ball valve in this embodiment includes at least two working states: a first working state and a second working state. When the ball valve is in the first working state, as shown in FIG. 11, the first channel 71 is communicated with the second channel 72 through the first valve core channel 14, and the third channel 73 is communicated with the fourth channel 74 through the second valve core channel 15. When the ball valve is in the second working state, as shown in FIG. 12, the first channel 71 is communicated with the fourth channel 74 through the first valve core channel 14, and the second channel 72 is communicated with the third channel 73 through the second valve core channel 15.

As shown in FIG. 5, an inner peripheral wall of the valve body part 40 is provided with a first protruding part 411 located one side of the first opening part 401 facing toward the inner bottom part 47. The first protruding part 411 protrudes inwardly with respect to the inner peripheral wall of the valve body part 40. One end of the first protruding part 411 facing away from the first opening part 401 extends to the inner bottom part 47, one end of the first protruding part 411 facing toward the first opening part 401 is formed with a first arc part 412, and the first arc part 412 is located below the first opening part 401. A central axis corresponding to the first arc part 412 coincides with or approximately coincides with a central axis of the first opening part 401, A magnitude of a central angle corresponding to the first arc part 412 is not specifically limited here. In this embodiment, the central angle corresponding to the first arc part 412 is 180°, thereby facilitating the demolding process in the injection molding of the valve body part 40.

Figure 13:
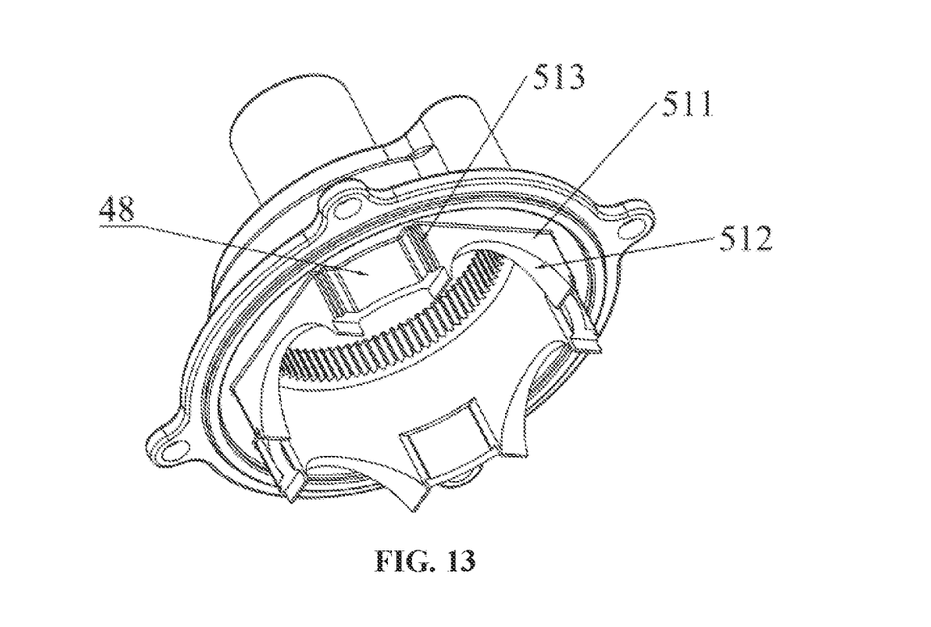
FIG. 13 is a schematic perspective view of a sleeve and a second valve body component provided by an embodiment of the present disclosure viewed from another perspective.
Figure 14:
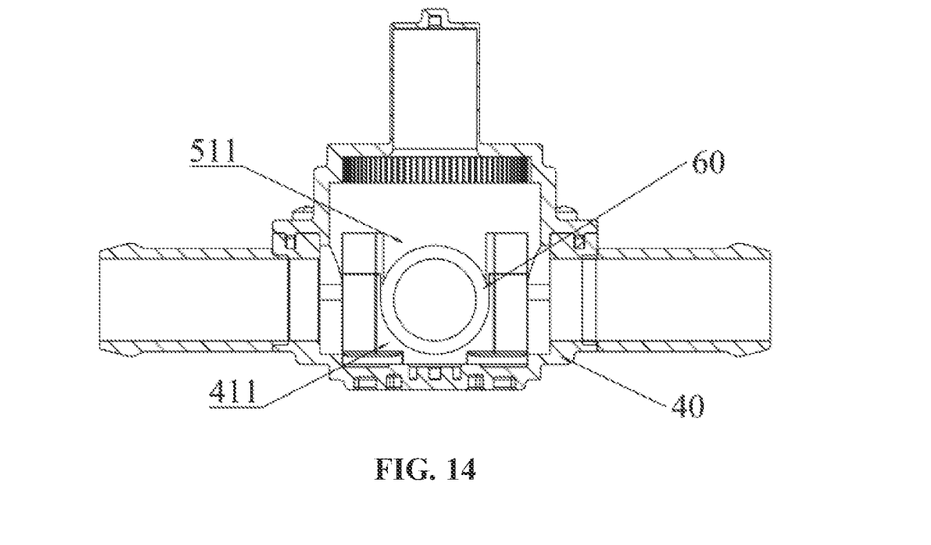
FIG. 14 is a schematic cross-sectional view of a sleeve and a valve body assembly in a ball valve provided by an embodiment of the present disclosure.

As shown in FIG. 13, one side of the second valve body component 6 facing toward the valve body part 40 is provided with a second protruding part 511, the second protruding part 511 is disposed opposite to the first protruding part 411, and the second protruding part is located above the first protruding part 411. One end of the second protruding part 511 facing toward the first opening part 401 is formed with a second arc part 512, and the second arc part 512 is disposed opposite to the first arc part 412. A central axis corresponding to the second arc part 512 coincides with or approximately coincides with a central axis of the first opening part 401. A magnitude of a central angle corresponding to the second arc part 512 is not specifically limited here. In this embodiment, the central angle corresponding to the second arc part 512 is 180°. As shown in FIG. 14, the first arc part 412 and the second arc part 512 cooperate to form a cylindrical space 60.

As shown in FIG. 2, the ball valve is further provided with a sealing ring 90 located within the space 60. The sealing ring 90 is position-limited between the first arc part 412 and the second arc part 512. The inner diameter of the sealing ring 90 is greater than the diameter of the first channel 71, and is also greater than the diameter of an inner channel of the valve core component 13. A first end of the sealing ring 90 abuts against an inner wall corresponding to the valve body part 40, and a second end of the sealing ring 90 abuts against an outer wall part corresponding to the valve core component 13, and the sealing ring 90 is also tightly pressed to and abuts against the first arc part 412 and the second arc part 512, respectively.

In the related art, in order to mount the sealing ring, the first opening part 401 is separated from the first valve body component 4, and the sealing ring 90 is mounted through a connection between the first opening part 401 and the first valve body component 4. Specifically, the sealing ring 90 is first mounted into the first valve body component 4, and then the first opening part 401 and the first valve body component 4 are fixed by welding or screwing or the like, and a direction in which the valve core component 13 is mounted into the first valve body component 4 is not coincident with a direction in which the sealing ring 90 is mounted into the first valve body component 4. In this embodiment, the sealing ring 90 can be position-limited through the cooperation of the first arc part 412 and the second arc part 512. The first protruding part 411 is disposed on the valve body part 40 and the second protruding part 511 is disposed on the second valve body component 6, so that the sealing ring 90 is easy to be assembled, the valve core component 13 and the sealing ring 90 are mounted into the first valve body component 4 from the port part 45, and thus parts are easy to be mounted.

The ball valve is respectively formed with a cylindrical space in a same or similar manner at the second opening part 402, the third opening part 403, and the fourth opening part 404, and is respectively provided with the sealing ring 90 at the second opening part 402, the third opening part 403, and the fourth opening part 404.

As shown in FIG. 5, the inner peripheral wall of the valve body part 40 is further provided with a third protruding part 46 located between the first opening part 401 and the second opening part 402. The third protruding part 46 extends from the inner bottom part 47 of the valve body part 40 to the top part of the valve body part 40. In this embodiment, a first side of the third protruding part 46 is smoothly or approximately smoothly connected to the first protruding part 411 corresponding to the first opening part 401, and a second side of the third protruding part 46 is smoothly connected or approximately smoothly connected to the first protruding part 411 corresponding to the second opening part 402, and the first side and the second side of the third protruding part 46 are opposite to each other. At least a part of the third protruding part 46 is located between two second protruding parts 511, and the second protruding part 511 is position-limited between two third protruding parts 46, which can improve the fitting accuracy between the second protruding part 511 and the first protruding part 411.

As shown in FIGS. 5 and 13, both sides of one end, facing toward the top part of the valve body part 40, of the third protruding part 46 are respectively provided with a first convex-concave part 461, and the second protruding part 511 is provided with a second convex-concave part 513 at a position corresponding to the first convex-concave part 461.

The first convex-concave part 461 cooperates with the second convex-concave part 513, so that the second valve body component 6 and the valve body part 40 can be bonded more firmly.

A thickness of a part of the third protruding part 46 located between the two second protruding parts 511 is less than a thickness of the first protruding part 411, and a connection between a part of the third protruding part 46 with a less thickness and a part of the third protruding part 46 with a greater thickness is formed with a shoulder part 460. The second valve body component 6 is further provided with a fourth protruding part 48 (refer to FIG. 13) located between the two second protruding parts 511. Both sides of the fourth protruding part 48 are smoothly connected or nearly smoothly connected to the second protruding part 511. The fourth protruding part 48 is disposed opposite to the shoulder part 460, and one end of the fourth protruding part 48 facing toward the valve body part 40 abuts against the shoulder part 460, so as to limit the second valve body component 6.

The respective third protruding part 46 and the respective first convex-concave part 461 of the third protruding part 46 are disposed between the second opening part 402 and the third opening part 403, between the third opening part 403 and the fourth opening part 404, and between the fourth opening part 404 and the first opening part 401 in the same or similar manner, and the second valve body component 6 are also provided with a corresponding second convex-concave part 513 in the same or similar manner.

What is claimed is:

1. A ball valve, comprising a drive mechanism, a transmission mechanism, a valve body assembly and a valve core component, wherein the transmission mechanism is configured to drive the valve core component to act through the drive mechanism;

wherein the valve body assembly comprises a first valve body component and a second valve body component, the first valve body component is fixedly connected to the second valve body component, the valve body assembly is formed with a containing cavity, the containing cavity comprises a first valve body component cavity and a second valve body component cavity, the first valve body component cavity is located within the first valve body component, the second valve body component cavity is located within the second valve body component, the valve core component is at least partially accommodated within the first valve body component cavity, and the transmission mechanism is at least partially located in the second valve body component cavity;

the transmission mechanism comprises a first gear ring, and at least part of the valve core component is fixedly connected to or in position-limiting fit with the first gear ring; and the valve core component comprises a platform part and a plane part, the platform part is located at or adjacent to a rotating center of the valve core component, one side of the first gear ring facing toward the valve core component abuts against the platform part, and the one side of the first gear ring facing toward the valve core component keeps a preset distance from the plane part.

2. The ball valve of claim 1, wherein the valve core component comprises a valve core ball and a valve core column, wherein a first end of the valve core column is fixedly connected or in position-limiting connection to the first gear ring;

a second end of the valve core column is fixedly connected to the valve core ball, or the valve core column and the valve core ball are an integrated structure; and a contact portion of the first gear ring abutting against the platform part has an outer diameter less than an inner diameter of the first gear ring.

3. The ball valve of claim 2, wherein the first gear ring has a central hole, and one end of the valve core column extends into the central hole and is fixedly connected or in position-limiting connection to the first gear ring;

the platform part is disposed on one side of the valve core ball facing toward the first gear ring, the valve core column is fixedly connected to the platform part, or the valve core column and the platform part are an integrated structure; or the platform part is disposed on the valve core column, and the platform part is fixedly connected to the valve core ball or the platform part and the valve core ball are an integrated structure;

an outer diameter of the platform part is less than the inner diameter of the first gear ring, the plane part is disposed on the one side of the valve core ball facing toward the first gear ring, the plane part is disposed around the platform part, and the platform part protrudes out of the plane part in a direction facing toward the first gear ring.

4. The ball valve of claim 2, wherein the first gear ring has a stepped hole part comprising a stepped part, the platform part is located at one end of the valve core column facing toward the first gear ring, the valve core column extends into the stepped hole part and is fixedly connected or in position-limiting connection to the first gear ring, the platform part abuts against the stepped part, and the plane part is disposed on one side of the valve core ball facing toward the first gear ring.

5. The ball valve of claim 3, wherein one side of the valve core component facing toward an inner bottom part of the first valve body component cavity is further provided with at least one limiting column, the inner bottom part of the first valve body component cavity is provided with a limiting groove cooperating with the at least one limiting column, and the at least one limiting column is in sliding fit with the limiting groove.

6. The ball valve of claim 5, wherein two limiting columns are provided, the two limiting columns are symmetrically disposed on two sides of an axis of the valve core component, respectively, the limiting groove comprises two arc-shaped grooves, the two arc-shaped grooves are symmetrically disposed along a center of the first valve body component, and an arc angle of each of the two arc-shaped grooves is 90°, each of the two limiting columns at least partially extends into a respective one of the two arc-shaped grooves, and the valve core component is configured to stop rotating when an inner wall of one end of each of the two arc-shaped grooves abuts against a respective one of the two limiting columns.

7. The ball valve of claim 6, wherein the drive mechanism comprises a rotor component, a motor shaft component and a sleeve, the rotor component is located in the sleeve, the motor shaft component is fixedly connected or in position-limiting connection to the rotor component, the sleeve is fixedly connected to or integrally formed with the second valve body component, the first valve body component comprises a valve body part and a sealing gasket, the valve body part has a port part, one end of the second valve body component cooperates with the port part, an end face part of the port part is further provided with an annular groove, and the sealing gasket is disposed within the annular groove;

the transmission mechanism further comprises a second gear ring and a planet gear, one side of the second gear ring facing away from the planet gear is fixedly connected to the second valve body component, or the second gear ring is integrally formed with the second valve body component.

8. The ball valve of claim 7, wherein the valve core component is provided with a through hole, the motor shaft component passes through the through hole, the motor shaft component is in clearance fit with an inner wall of the valve core component corresponding to the through hole, and one end of the motor shaft component extends out of the valve core component and is position-limited to the first valve body component.

9. The ball valve of claim 8, wherein the rotor component is provided with a first via hole, one end of the motor shaft component passes through the first via hole and is position-limited in the sleeve, the sleeve is a tubular body with one end closed, and a first blind hole part protruding outward is disposed at or adjacent to a center of a top part of the sleeve, one end of the motor shaft component facing toward the rotor component extends into the first blind hole part, the motor shaft component is in clearance fit with the first blind hole part, and an inner bottom part of the valve body part is provided with a second blind hole part at a position corresponding to the through hole, one end of the motor shaft component facing toward the valve core component extends into the second blind hole part, and the motor shaft component is in clearance fit with the second blind hole part.

10. The ball valve of claim 9, wherein the transmission mechanism further comprises a sun gear, the sun gear is provided with a second via hole at or adjacent to an axial central line of the sun gear, the motor shaft component passes through the second via hole, and the motor shaft component is fixedly connected or in position-limiting connection to the sun gear.

11. The ball valve of claim 7, further comprising a sealing ring, wherein a peripheral side of the valve body part is provided with at least two opening parts, an inner peripheral wall of the valve body part is protrudingly provided with a first protruding part, and the first protruding part is disposed on one side of at least one of the at least two opening parts and is adjacent to the inner bottom part of the valve body part, a first end of the first protruding part facing away from the at least two opening parts extends to the inner bottom part of the valve body part, a second end of the first protruding part facing toward the at least two opening parts is formed with a first arc part, and the first arc part is located below the at least two opening parts; and one side of the second valve body component facing toward the valve body part is provided with a second protruding part, the second protruding part is disposed opposite to the first protruding part, and one end of the second protruding part facing toward the at least two opening parts is formed with a second arc part, the first arc part cooperates with the second arc part, the sealing ring is disposed between the first arc part and the second arc part, and the sealing ring is pressed to and abuts against the first arc part and the second arc part, respectively.

12. The ball valve of claim 11, wherein the at least two opening parts are disposed in one-to-one correspondence with first protruding parts of the valve body part, and a number of second protruding parts of the second valve body component is the same as a number of the first protruding parts; the inner peripheral wall of the valve body part is further provided with a plurality of third protruding parts extending from the inner bottom part of the valve body part to a top part of the valve body part, and one side of each of the plurality of the third protruding parts is connected to the first protruding part, and the plurality of third protruding parts are at least partially located between every two adjacent second protruding parts, so that each second protruding part is position-limited between every two adjacent third protruding parts.

13. The ball valve of claim 12, wherein a part of each of the plurality of third protruding parts located between the every two adjacent second protruding parts has a thickness less than or equal to a thickness of the first protruding part;

both sides of one end of the each of the plurality of third protruding parts facing toward the top part of the valve body part are respectively provided with a first convex-concave part, the second protruding part is provided with a second convex-concave part at a site corresponding to the first convex-concave part, and the first convex-concave part cooperates with the second convex-concave part; and a connection between a part of the each of the plurality of third protruding parts with a less thickness and a part of the each of the plurality of third protruding parts with a greater thickness is formed with a shoulder part, the second valve body component is further provided with a fourth protruding part between the every two adjacent second protruding parts, the fourth protruding part is disposed opposite to the shoulder part, and one end of the fourth protruding part facing toward the valve body part abuts against the shoulder part.

14. The ball valve of claim 4, wherein one side of the valve core component facing toward an inner bottom part of the first valve body component cavity is further provided with at least one limiting column, the inner bottom part of the first valve body component cavity is provided with a limiting groove cooperating with the at least one limiting column, and the at least one limiting column is in sliding fit with the limiting groove.

15. The ball valve of claim 8, further comprising a sealing ring, wherein a peripheral side of the valve body part is provided with at least two opening parts, an inner peripheral wall of the valve body part is protrudingly provided with a first protruding part, and the first protruding part is disposed on one side of at least one of the at least two opening parts and is adjacent to the inner bottom part of the valve body part, a first end of the first protruding part facing away from the at least two opening parts extends to the inner bottom part of the valve body part, a second end of the first protruding part facing toward the at least two opening parts is formed with a first arc part, and the first arc part is located below the at least two opening parts; and one side of the second valve body component facing toward the valve body part is provided with a second protruding part, the second protruding part is disposed opposite to the first protruding part, and one end of the second protruding part facing toward the at least two opening parts is formed with a second arc part, the first arc part cooperates with the second arc part, the sealing ring is disposed between the first arc part and the second arc part, and the sealing ring is pressed to and abuts against the first arc part and the second arc part, respectively.

16. The ball valve of claim 9, further comprising a sealing ring, wherein a peripheral side of the valve body part is provided with at least two opening parts, an inner peripheral wall of the valve body part is protrudingly provided with a first protruding part, and the first protruding part is disposed on one side of at least one of the at least two opening parts and is adjacent to the inner bottom part of the valve body part, a first end of the first protruding part facing away from the at least two opening parts extends to the inner bottom part of the valve body part, a second end of the first protruding part facing toward the at least two opening parts is formed with a first arc part, and the first arc part is located below the at least two opening parts; and one side of the second valve body component facing toward the valve body part is provided with a second protruding part, the second protruding part is disposed opposite to the first protruding part, and one end of the second protruding part facing toward the at least two opening parts is formed with a second arc part, the first arc part cooperates with the second arc part, the sealing ring is disposed between the first arc part and the second arc part, and the sealing ring is pressed to and abuts against the first arc part and the second arc part, respectively.

17. The ball valve of claim 10, further comprising a sealing ring, wherein a peripheral side of the valve body part is provided with at least two opening parts, an inner peripheral wall of the valve body part is protrudingly provided with a first protruding part, and the first protruding part is disposed on one side of at least one of the at least two opening parts and is adjacent to the inner bottom part of the valve body part, a first end of the first protruding part facing away from the at least two opening parts extends to the inner bottom part of the valve body part, a second end of the first protruding part facing toward the at least two opening parts is formed with a first arc part, and the first arc part is located below the at least two opening parts; and one side of the second valve body component facing toward the valve body part is provided with a second protruding part, the second protruding part is disposed opposite to the first protruding part, and one end of the second protruding part facing toward the at least two opening parts is formed with a second arc part, the first arc part cooperates with the second arc part, the sealing ring is disposed between the first arc part and the second arc part, and the sealing ring is pressed to and abuts against the first arc part and the second arc part, respectively.

* * * * *